Dec. 8, 1931.  J. JOY  1,835,652
CLUTCH
Filed Feb. 27, 1930  2 Sheets-Sheet 1
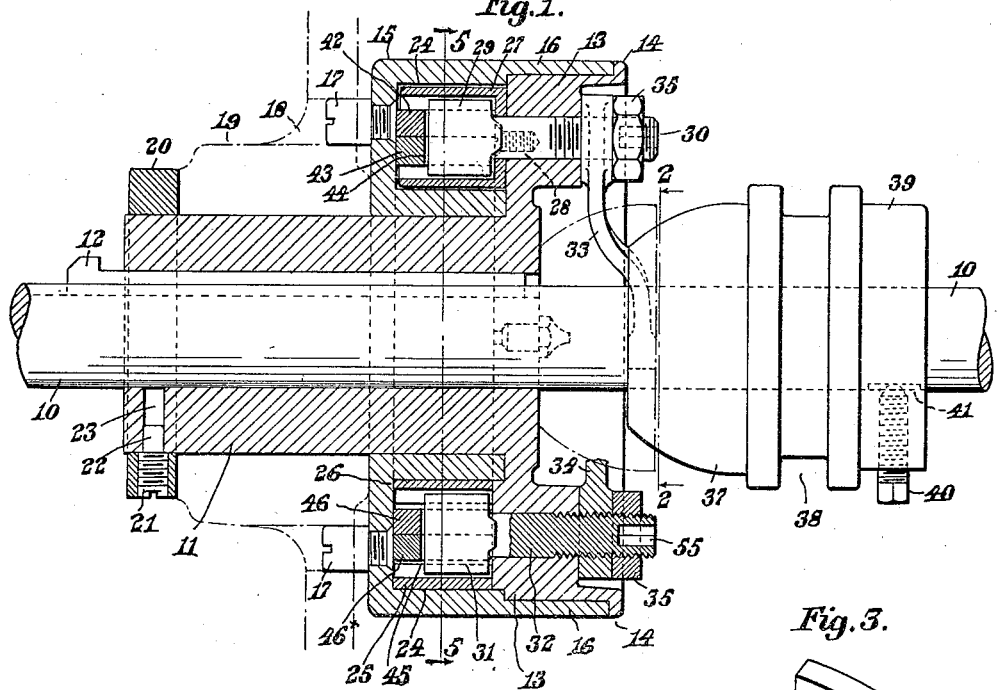
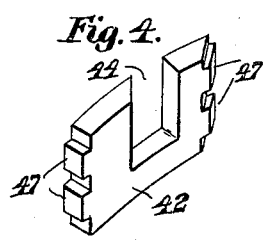
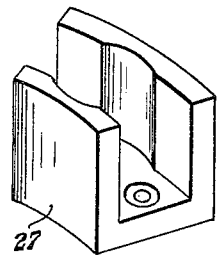
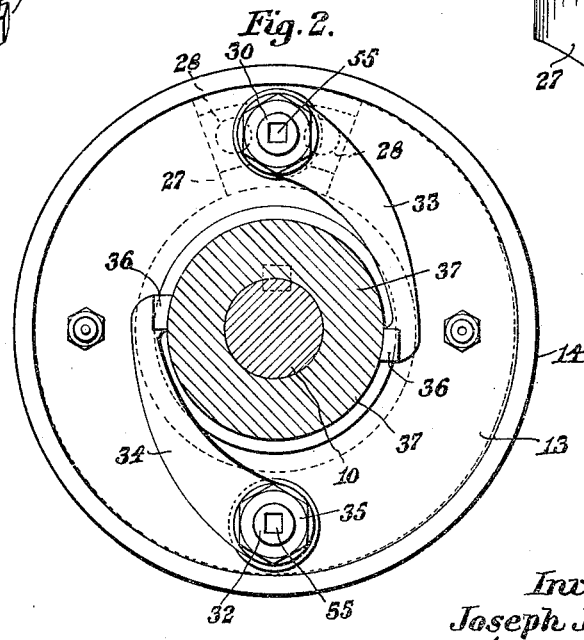
Inventor:
Joseph Joy,
by Walter E. Lombard,
Atty.

Dec. 8, 1931. J. JOY 1,835,652
CLUTCH
Filed Feb. 27, 1930   2 Sheets-Sheet 2
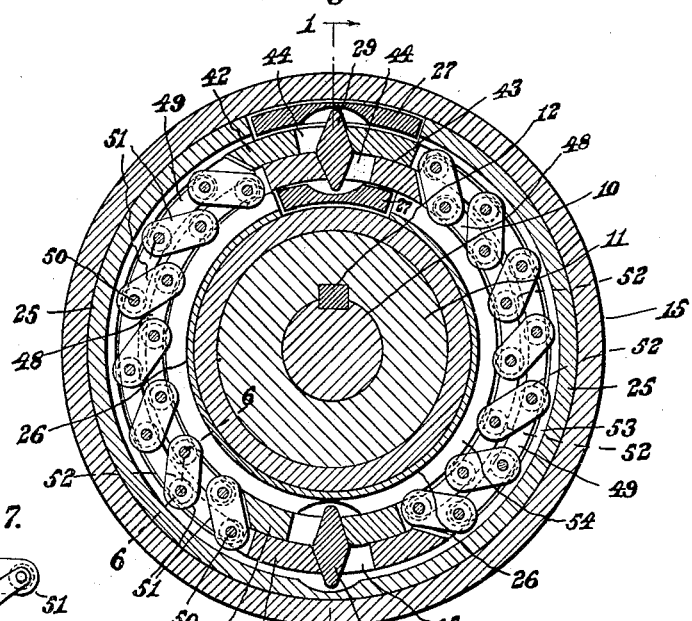
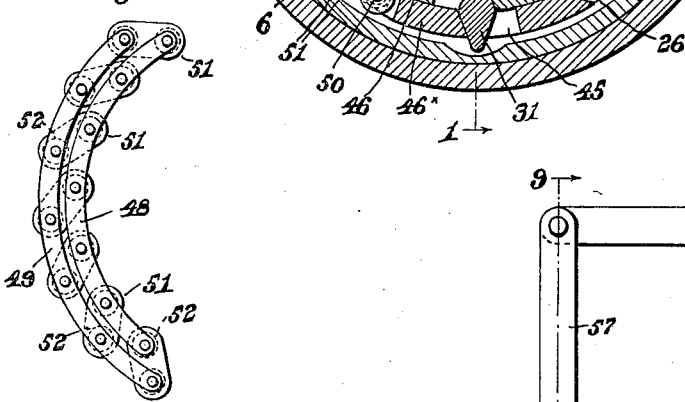
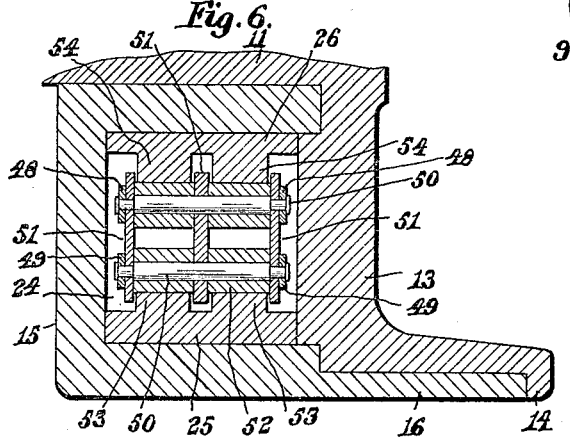
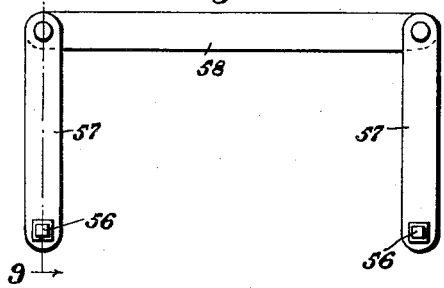
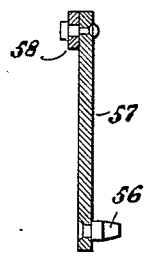
Inventor:
Joseph Joy,
by Walter E. Lombard.
Atty Patented Dec. 8, 1931

1,835,652

UNITED STATES PATENT OFFICE

JOSEPH JOY, OF NEW YORK, N. Y.

CLUTCH

Application filed February 27, 1930. Serial No. 431,733.

This invention relates to clutches and has for its object the production of a clutch in which two split rings are disposed in a recess in one member with separating mechanism between the rings adapted to be actuated by means carried by the other member, whereby the split rings will be forced into frictional contact with the cylindrical walls of said recess thereby locking the two members together.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a vertical section of a clutch embodying the principles of the present invention, the cutting plane being on line 1, 1, on Fig. 5.

Figure 2 represents a transverse section of same on line 2, 2, on Fig. 1.

Figure 3 represents a perspective of the block for holding the pushing members.

Figure 4 represents a perspective of one of said pushing members.

Figure 5 represents a transverse section of the clutch on line 5, 5, on Fig. 1.

Figure 6 represents a section on line 6, 6, of Fig. 5.

Figure 7 represents a plan of one of the separating members.

Figure 8 represents an elevation of a tool to be used in connection with the clutch to give an initial setting to the cam members, and Figure 9 represents a section on line 9, 9, on Fig. 8.

Similar characters indicate like parts throughout the several figures of the drawings.

In the drawings, 10 is a revoluble shaft surrounded by a tubular member 11 secured thereto by means of a key 12.

From one end of this revoluble member 11 extends an annular flange 13 having at its extreme outer end an annular lip 14.

Surrounding the tubular member 11 is a drum 15 having an annular extension 16 fitted over the periphery of the flange 13 and having its outer end abutting the annular lip 14.

This drum 15 has extending therefrom a plurality of studs 17 adapted to be inserted into openings 18 in a pulley 19 or similar member to be driven, said pulley being indicated by dotted lines in Fig. 1.

The tubular member 11 has a collar 20 mounted thereon provided with a screw 21 having a reduced shank 22 inserted into a radial hole 23 in said tubular member.

This collar 20 abuts the outer end of the pulley 19 and retains it in position on the tubular member 11.

The drum 15 has an annular recess 24 in one face thereof and in this recess are loosely disposed an outer split ring 25 and an inner split ring 26.

Between the ends of the split rings 25 and 26 and positioned in the recess 24 is a U-shaped block 27 secured to the flange 13 by means of screws 28.

Within the block 27 is disposed a cam member 29 having a shank 30 extending through one wall of said block and the flange 13.

Diametrically opposite the cam 29 is disposed a similar cam 31 having a shank 32 extending through the flange 13.

The shanks 30 and 32 respectively have threaded thereto the levers 33, 34.

These levers are retained in adjusted position upon the shanks 30, 31 by clamp nuts 35.

The free ends of the levers 33, 34 have enlarged portions 36 adapted to bear upon the cone member 37 movable endwise of the shaft 10.

This cone member 37 is provided with an annular groove 38 with which any well known shifting device may coact to move said cone 37 endwise of the shaft 10.

The outward movement of the cone member 37 is limited by the collar 39 surrounding the shaft 10 and secured thereto by the set screw 40.

The inner end of this set screw extends into an elongated depression 41 formed in the shaft 10, so that said collar may be adjusted lengthwise of said shaft 10 and locked in its adjusted position by the set screw 40.

Disposed within the U-shaped block 27 are two pushing members 42 and 43, said pushing members having notches 44 therein in which is disposed the cam member 29.

The cam member 31 is similarly disposed in notches 45 in the pushing members 46 and 46x.

Each cam member 29 and 31 is preferably diamond-shaped as indicated in Fig. 5 of the drawings, and oppositely disposed faces thereof are normally in contact with inclined walls of the notches 44, 45.

It is obvious, therefore, that as soon as the cams 29, 31 are rotated the pushing members 42, 43, 46, 46x, will be moved lengthwise in the recess 24.

Each pushing member is provided at opposite ends thereof with the projections 47, the projections 47 at one end having inclined faces.

Between the two sets of pushing members and disposed in the recess 24 are two sets of arcuate plates 48 and 49 connected by arbors 50 extending through the opposite ends of a plurality of connector plates 51, and between these connector plates and surrounding the arbors 50 are a plurality of rollers 52.

When the curved plates 48, 49 with their connector plates 51 and rollers 52 surrounding the arbors 50 are disposed in the recess, the outer end rollers 52 will bear against projections 47 upon the pushing members 42 and 46x, while the inner end rollers will bear against similar projections 47 upon the pushing members 43 and 46.

The split rings 25 and 26 have projecting tracks 53, 54, formed thereon on which the rollers 52 are adapted to rotate about the arbors 50.

The normal position of the connector members 51 are as shown in Fig. 5, and when in this position the drum 15 is free to revolve relatively to the split rings 25 and 26.

As soon, however, as the cams 29, 31 are rotated to actuate the pushing members 42, 43, 46, 46x, the various connector members will be moved into a position more nearly radial to the axis of the shaft 10, and cause the split rings 25, 26, to be separated and forced into frictional contact with the cylindrical walls of the recess 24 so that the drum 15 will be locked to said rings 25 and 26.

When the rings 25, 26, are impinging upon the walls of the recess 24 in this manner, the drum 15 and the tubular member 11 will rotate together.

The shanks 30, 32 have squared recesses 55 in the outer ends thereof, these recesses being adapted to receive the squared shanks 56 of a tool consisting of two bars 57 connected together at the opposite end by a link 58.

This tool is used to give an initial adjustment of the cam members 29, 31, and then is removed.

The squared shanks 56 of the tool are inserted into the recesses 55 in the outer ends of the shanks 30 and 32 and while the clamp nuts 35 are free from contact with the levers 33 the cam members 29, 31 are moved simultaneously into their normal positions and then the clamp nuts 35 are moved against said levers 33 to lock them to the threaded shanks 30 and 32.

By the use of the tool both cam members therefore are at the same time brought into exactly the same position relatively to the pushing members 42, 43, 46 and 46x with which said cam members 29, 31 coact.

When the pushing members 42, 43 are moved in opposite directions by the cam member 29 the flat ended projections 47 of one member 42 will come into contact with the rollers 52 at the end of the outer arcuate plates 49 and force said arcuate plates in one direction while the arcuate plates 48 are being forced in the opposite direction by the flat ended projections 47 contacting with the rollers 52 at the end of the said plates 48.

At the same time the movement of cam member 31 will cause the pushing members 46, 46x to move in opposite directions against rollers 52 at the opposite ends of said arcuate plates 49, 48.

The combined movement of these pushing members will tend to move the connector plates 51 more nearly radial and in so doing force the rollers 52 against the bearing faces 53, 54 of the split rings 25, 26 and cause said rings 25, 26 to impinge upon the opposite annular walls of the recess 24 so that the members 13, 15 will be temporarily locked together.

When the cam members 29, 31 are returned to their normal position the spring of the metal of which the split rings 25, 26 is made will permit said rings to be released from gripping contact with the annular walls of said recess 24.

The inclined faces of one set of projections 47 perform no office, these projections being thus formed to provide as much bearing surface as possible between the pushing members 42, 43, 46 and 46x and the split rings with which they coact.

The pushing members 42, 43 are arcuate and in contact with one another, the line of contact being coincident with the axis of the cam member 29 so that when said cam member is oscillated the movement in opposite directions of these members is assured.

The member 42 rides on the inner bearing surfaces of the outer split ring 25 while the other member 43 rides on the outer bearing surfaces of the inner ring 26.

Similar action takes place with cam member 31 and pushing members 46, 46x.

The outer ends of arbors or spindles 50 are upset over the outer faces of the arcuate plates 48, 49, thereby securing together all the elements of the ring separating mechanism so that each ring separating mechanism may be inserted into or removed from the recess 24 as a unit.

Any desired degree of frictional contact between the rings 25, 26, and the cylindrical walls of the recess 24, may be obtained by the adjustment of the cone member 37.

It is believed that the operation and many advantages of the invention will be understood without further description.

Having thus described my invention, I claim

1. The combination of a revoluble shaft, a tubular member surrounding and revoluble with said shaft; a drum freely revoluble on said tubular member and having a recess in one face thereof; two split rings disposed in said recess; two arcuate plates within said recess, one of less diameter than the other; means carried by and secured to said arcuate plates for separating said rings; and means carried by said tubular member for moving said arcuate plates in opposite directions thereby forcing said rings into frictional contact with the walls of said recess.

2. The combination of a revoluble shaft, a tubular member surrounding and revoluble with said shaft; a drum freely revoluble on said tubular member and having a recess in one face thereof; two split rings disposed in said recess; two sets of arcuate plates with each set oppositely disposed within said recess; means carried by and secured to said arcuate plates for separating said rings; a cam carried by said tubular member for moving said arcuate plates in opposite directions thereby forcing said rings into frictional contact with the walls of said recess; and means for actuating said cam.

3. The combination of a revoluble shaft, a tubular member surrounding and revoluble with said shaft; a drum freely revoluble on said tubular member and having a recess in one face thereof; two split rings disposed in said recess; two sets of parallel arcuate plates oppositely disposed within said recess; ring-separating means carried by and secured to said arcuate plates including rollers contacting with said split rings; and means carried by said tubular member for moving said arcuate plates in opposite directions thereby forcing said rings into frictional contact with the walls of said recess.

4. The combination of a revoluble shaft, a tubular member surrounding and revoluble with said shaft; a drum freely revoluble on said tubular member and having a recess in one face thereof; two split rings disposed in said recess; two sets of arcuate plates within said recess; ring-separating means carried by said arcuate plates including rollers contacting with said split rings; pushing members contacting with the end rollers carried by said arcuate plates; a cam carried by said tubular member for moving said pushing members and arcuate plates in opposite directions, thereby forcing said rings into frictional contact with the walls of said recess; and means for actuating said cam.

5. The combination of a revoluble shaft, a tubular member surrounding and revoluble with said shaft; a drum freely revoluble on said tubular member and having a recess in one face thereof; two split rings disposed in said recess; two sets of arcuate plates each set being parallel and oppositely disposed within said recess; arbors extending through each set of plates; rollers on said arbors between said plates and contacting with said rings; normally inclined plates connecting the arbors of one set of arcuate plates with the arbors of the other set of arcuate plates; and means carried by said tubular member for moving said arcuate plates in opposite directions thereby moving said connecting plates into positions more nearly radial to said shaft and forcing said rings into frictional contact with the walls of said recess.

6. The combination of a revoluble shaft, a tubular member surrounding and revoluble with said shaft; a drum freely revoluble on said tubular member and having a recess in one face thereof; two split rings disposed in said recess; two sets of arcuate plates each set being parallel and oppositely disposed within said recess; arbors extending through both sets of arcuate plates; rollers on said arbors between said plates and contacting with said rings; normally inclined plates connecting the arbors of one set of arcuate plates with the arbors of the other set of arcuate plates; a cam carried by said tubular member for moving said arcuate plates in opposite directions thereby moving said connecting plates into positions more nearly radial to said shaft and forcing said rings into frictional contact with the walls of said recess; and means for actuating said cam.

7. The combination of a revoluble shaft, a tubular member surrounding and revoluble with said shaft; a drum freely revoluble on said tubular member and having a recess in one face thereof; two split rings disposed in said recess; two sets of arcuate plates each set being parallel and oppositely disposed within said recess one set being within and separated from the other set; arbors extending through said plates; rollers on said arbors between said plates and contacting with said rings; connecting plates between adjacent arbors of both sets of arcuate plates and normally inclined; a cam carried by said tubular member for moving said arcuate plates in opposite directions thereby moving said connecting plates into positions more nearly radial to said shaft and forcing said rings into frictional contact with the walls of said recess; a lever for actuating said cam; and a cone member slidable on said shaft and coacting with said lever.

8. The combination or a revoluble shaft, a tubular member surrounding and revoluble with said shaft; a drum freely revoluble on said tubular member and having a recess in one face thereof; two split rings disposed in said recess; pushing members within said recess; two sets of arcuate plates within said recess with their ends adjacent said pushing members; arbors extending through said plates; rollers on said arbors contacting with said rings; connecting plates between said arbors and normally inclined; a cam coacting with said pushing members and carried by said tubular member for moving said arcuate plates in opposite directions thereby moving said connecting plates into positions more nearly radial to said shaft and forcing said rings into frictional contact with the walls of said recess; and means for actuating said cam.

9. The combination of a revoluble shaft, a tubular member surounding and revoluble with said shaft; a drum freely revoluble on said tubular member and having a recess in one face thereof; two split rings disposed in said recess; two sets of arcuate plates each set being parallel and oppositely disposed within said recess with one set of less diameter than the other set and separated therefrom; separating means pivotally connected to said arcuate plates and including rollers contacting with said split rings; a cam carried by said tubular member for moving said arcuate plates in opposite directions thereby actuating said separating means and forcing said rings into frictional contact with the walls of said recess; a lever for actuating said cam; and a cone member slidable on said shaft and coacting with said lever.

10. The combination of a revoluble shaft, a tubular member surrounding and revoluble with said shaft; a drum freely revoluble on said tubular member and having a recess in one face thereof; two split rings disposed in said recess; pushing members within said recess; two sets of arcuate plates within said recess with their ends adjacent said pushing members; means carried by said arcuate plates including rollers contacting with said rings with the end rollers in contact with the ends of said pushing members; a cam coacting with said pushing members and carried by said tubular member for moving said pushing members and arcuate plates in opposite directions thereby forcing said rings into frictional contact with the walls of said recess; and means for actuating said cam.

11. The combination of a revoluble shaft, a tubular member surrounding and revoluble with said shaft; a drum freely revoluble on said tubular member and having a recess in one face thereof; two split rings disposed in said recess; two sets of arcuate plates each set being parallel and oppositely disposed within said recess; members pivoted at opposite ends to both sets of arcuate plates; rollers on the opposite ends of said pivoted members contacting with said rings; and means carried by said tubular member for moving said arcuate plates in opposite directions thereby forcing said rings into frictional contact with the walls of said recess.

12. The combination of a revoluble shaft, a tubular member surrounding and revoluble with said shaft; a drum freely revoluble on said tubular member and having a recess in one face thereof; two split rings disposed in said recess; pushing members within said recess; two sets of arcuate plates within said recess with their ends adjacent said pushing members; members pivoted to said arcuate plates; rollers on the opposite ends of said pivoted members and contacting with said rings; a cam coacting with said pushing members and carried by said tubular member for moving said pushing members and arcuate plates in opposite directions thereby forcing said rings into frictional contact with the walls of said recess; and means for actuating said cam.

13. The combination of a revoluble shaft, a tubular member surrounding and revoluble with said shaft; a drum freely revoluble on said tubular member and having a recess in one face thereof; two split rings disposed in said recess; notched pushing members within said recess; two sets of arcuate plates within said recess with their ends adjacent said pushing members; arbors extending through said plates; rollers on said arbors contacting with said rings; connecting plates between said arbors and normally inclined; a cam within the notches of said pushing members and carried by said tubular member for moving said arcuate plates in opposite directions thereby moving said connecting plates into positions more nearly radial to said shaft and forcing said rings into frictional contact with the walls of said recess; and means for actuating said cam.

14. The combination of a revoluble shaft, a tubular member surrounding and revoluble with said shaft; a drum freely revoluble on said tubular member and having a recess in one face thereof; two split rings disposed in said recess; pushing members within said recess; two sets of arcuate plates within said recess with their ends adjacent said pushing members; arbors extending through said plates; rollers on said arbors contacting with said rings; connecting plates between said arbors and normally inclined; a diamond shaped cam carried by said tubular member having oppositely disposed flat faces normally contacting with inclined walls on said pushing members and adapted to be oscillated to move said arcuate plates in opposite directions thereby moving said connecting plates into positions more nearly radial to said shaft and forcing said rings into frictional contact with the walls of said recess; and means for actuating said cam.

15. The combination of a revoluble shaft, a tubular member surrounding and revoluble with said shaft; a drum freely revoluble on said tubular member and having a recess in one face thereof; pushing members within said recess; two split rings disposed in said recess; two sets of arcuate plates within said recess with their ends adjacent said pushing members; members for separating said split rings pivoted to said arcuate plates; and means carried by said tubular member for moving said arcuate plates in opposite directions thereby actuating said separating members and forcing said rings into frictional contact with the walls of said recess.

16. The combination of a revoluble shaft, a tubular member surrounding and revoluble with said shaft; a drum freely revoluble on said tubular member and having a recess in one face thereof; two split rings disposed in said recess; pushing members within said recess; two sets of arcuate plates within said recess with their ends adjacent said pushing members; members for separating said split rings pivoted to said arcuate plates; a cam normally contacting with walls on said pushing members and carried by said tubular member for moving said arcuate plates in opposite directions thereby moving said separating members into positions to force said rings into frictional contact with the walls of said recess; and means for actuating said cam.

Signed by me at 200 Hudson Street New York, N. Y., this 21st day of February, 1930.

JOSEPH JOY.